United States Patent [19]

Oblizajek et al.

[11] Patent Number: 4,593,557
[45] Date of Patent: Jun. 10, 1986

[54] TIRE TESTING APPARATUS

[75] Inventors: Kenneth L. Oblizajek; Cornelius Lauer, both of Troy; Eugene H. Culp, Detroit, all of Mich.

[73] Assignee: Uniroyal Tire Company, Inc., Middlebury, Conn.

[21] Appl. No.: 705,815

[22] Filed: Feb. 26, 1985

[51] Int. Cl.[4] ............................................. G01M 17/02
[52] U.S. Cl. ..................................................... 73/146
[58] Field of Search .................................. 73/146, 9, 8

[56] References Cited

U.S. PATENT DOCUMENTS 3,069,904  12/1962  Henry ................................... 73/146
4,144,748   3/1979  Vinogradov et al. ................ 73/146

FOREIGN PATENT DOCUMENTS

813319  9/1951  Fed. Rep. of Germany ........ 73/146

Primary Examiner—Donald O. Woodiel
Attorney, Agent, or Firm—Donald W. Walk

[57] ABSTRACT

An apparatus is disclosed for the evaluation and diagnosis of tire contributions to annoying erratic motions of a vehicle, which motions are induced when the vehicle travels over longitudinally grooved pavement. The apparatus utilizes a vehicle the forward end of which is supported on a laterally movable carriage, with freedom to yaw, and the rear end of which carries a loaded test tire and an axially spaced companion tire on respective curcumferentially grooved and circumferentially smooth tire driving means. Sensor means are provided to measure transverse or angular motions or displacements generated as the test tire moves laterally across the grooved drive surfaces in response to lateral movement of the carriage.

20 Claims, 10 Drawing Figures

TIRE TESTING APPARATUS

BACKGROUND OF THE INVENTION

This invention relates to an apparatus for the evaluation and diagnosis of tire contributions to erratic motions of a vehicle which are induced when the vehicle travels over longitudinally grooved pavement.

Highways in many parts of the country are frequently grooved to promote drainage of water, affording improved wet traction performance of vehicles. The grooves are sometimes oriented laterally with respect to vehicle motion, but are predominantly oriented longitudinally. This can cause problems because when oriented longitudinally, tires interact with the grooves and produce erratic motions of the vehicle, resulting in perceptions of darty, uncontrollable side displacements (hereinafter referred to as "groove wander"). The actual sideward motions of the vehicle are small in magnitude, not affecting the safe control of the vehicle. However, they contribute to the discomfort of the ride as perceived by the occupants.

It is known that control over the interaction of tire and road grooves resides in the type of highway grooving (viz. width, depth, spacing) and certain mechanical actions and dimensional properties of tires. The most effective means of suppressing the vehicular activity through tire alteration consists of, but is not limited to, varying the distribution of material in the tread by changing the specific patterns of ribs, lugs and voids therein.

Evaluations of the degree of discomfort attributable to tires on a given road surface of the grooved variety have, in the past, been accomplished subjectively by trained individuals experienced with the phenomenon. Substitution of sets of tires on a chosen vehicle readily allows for a comparison of these effects. With sizable accumulation of such performance data, one is eventually equipped to empirically develop tire design criteria, aiding the further development of tires with notably improved responses.

The effects of tread design on this phenomenon of groove wander, due to the interaction of a tire tread and road grooves, has fostered the development of certain analytical techniques for analyzing and diagnosing the spatial relationships of individual tire tread details. These techniques, however, evolved during a time when commercial tires featured circumferential "ribs" (or the appearance of such). The techniques relied on the actual presence, or judicious perception of the presence (by experienced personnel), of these distinguishable "ribs" of tires. The techniques, unfortunately, and for obvious reasons, fall short of application to the more complex tread designs penetrating the tire market in the 1980s. As enhancements in other areas of performance are attained through the implementation of new tread designs and since their acceptance is ever increasing, the industry actively seeks effective methods of analyzing and suppressing "groove wander".

It is, therefore, a primary object of this invention to provide laboratory equipment and procedures for fulfilling industry's needs for: (1) evaluating those mechanical actions of tires which lead to erratic vehicular performance occurring on longitudinally grooved pavements; and (2) diagnosing contributions of different portions of a tire tread to performance achieved on grooved pavement, thereby aiding in the isolation and avoidance of problem conditions.

Further objects and advantages of the invention will become apparent as the following description proceeds.

SUMMARY OF THE INVENTION

Briefly stated, and in accordance with one embodiment of this invention, the subject tire testing apparatus consists of hardware designed and assembled to specially constrain and measure the actions of a tire as it contacts a grooved test drum. A specimen test tire is mounted on one position of a vehicle appropriately positioned and supported on a chassis dynamometer. The tire tread is exposed to the grooved drum which acts as a counterpart for a grooved highway surface. A companion tire also supports the load of the vehicle, but runs on a smooth-surfaced drum. The forward load of the vehicle is supported through a series of bearings, fastened to a carriage which is driven laterally. The bearings permit free rotation in yaw and constitute a virtually "moment-free" constraint at the forward mount. Neglecting any inertial contributions that can arise as the carriage is driven laterally, the vehicle will continuously assume yaw attitudes such that the moment at these bearings vanishes, owing to the varying details of engagement of tire and drum. Testing of tires is based on a process of slowly driving the forward carriage laterally and measuring these yaw attitudes of the vehicle as a function of the lateral position of the rotating test tire on the grooved drum surface.

BRIEF DESCRIPTION OF THE DRAWINGS

While the specification concludes with claims particularly pointing out and distinctly claiming the subject matter regarded as this invention, it is believed that the invention will be better understood from the following description taken in connection with the accompanying drawings in which:

DETAILED DESCRIPTION OF THE INVENTION

Figure 1:
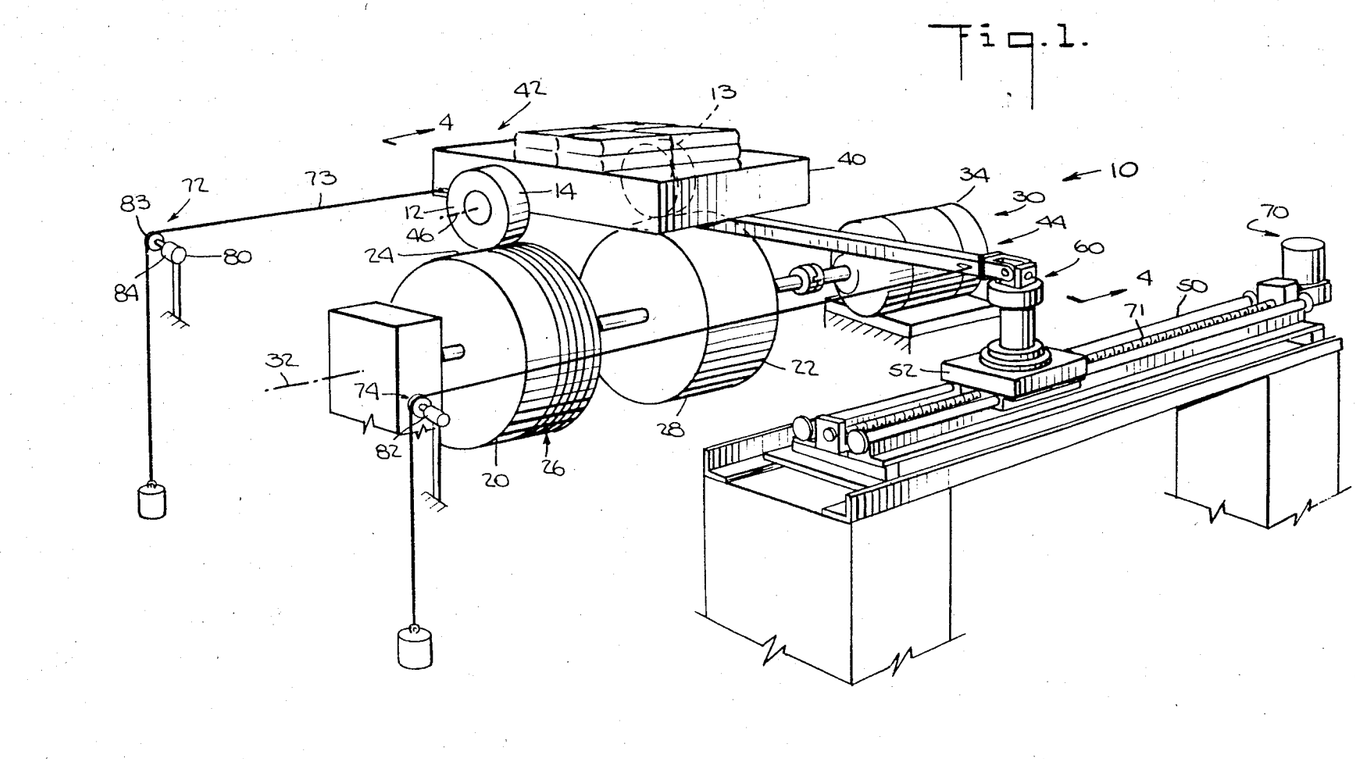
FIG. 1 is a perspective view of the apparatus of the subject invention.
Figure 2:
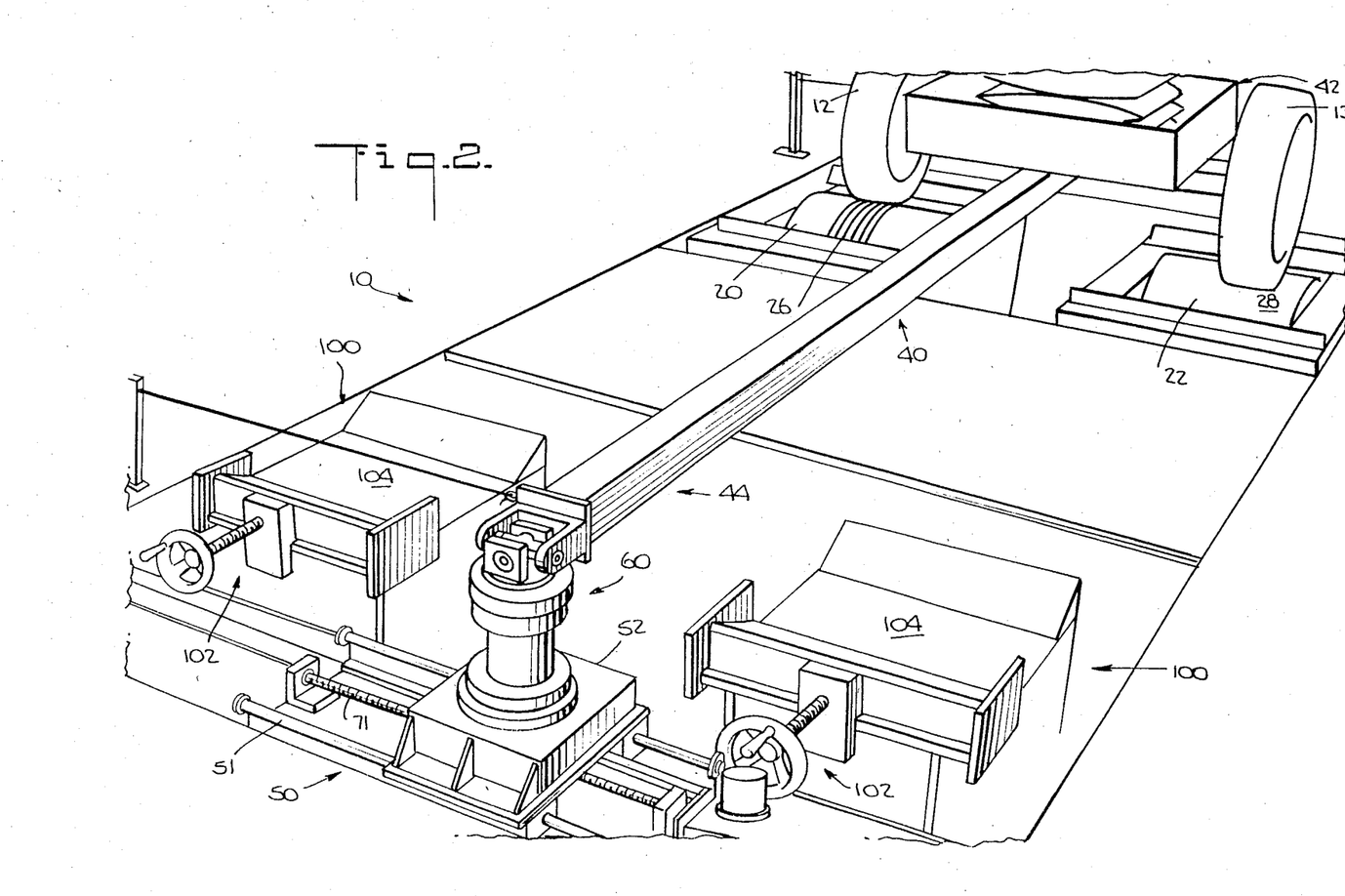
FIG. 2 is a perspective view of the apparatus of the subject invention taken from a different angle.

There is shown in FIG. 1 and FIG. 2, overall illustrations of the tire testing apparatus 10 of the subject invention. This tire testing apparatus 10 is designed for the purpose of evaluating the overall mechanical action of a complete tire leading to the erratic vehicular performance occurring on longitudinally grooved pavement, and diagnosing regional tire tread contributions to the performance achieved on the road, thereby aiding in the isolation and avoidance of problematic conditions.

The equipment 10 comprises hardware designed and assembled to specially constrain and measure the actions of a test tire 12 and its tread 14 as it engages a grooved rotatable support drum 20. The test tire 12 is mounted on one position of a tire support means 40 appropriately positioned and supported on a chassis dynamometer 30. The first rotatable support drum 20, which is positioned to engage the test tire 12, is provided with a number of grooves 26 that are specially positioned on the rotatable support drum 20 for the purpose of simulating longitudinally grooved roadways.

A companion tire 13 shares support of the load of the tire support means 40. This companion tire runs on a second coaxial rotatable support drum 22 that is provided with a smooth outer surface 28. The axis of rotation of the support drum is generally indicated as a dashed line 32. The axis of rotation of the tires 12 and 13 is generally indicated as another dashed line at 46. The chassis dynamometer 30 includes a means 34 for rotating the drums 20 and 22. The drums may be rotated at whatever speed is desired, such that the interaction with the tires approximates a desired equivalent vehicle speed depending on the desired test conditions.

The forward load of the tire support means 40 is supported with a pivotal interconnection through a coupling means 60. This coupling means 60 is provided with a plurality of bearings that operate in such a manner so as to permit the tire support means 40 to move in respect to the coupling means 60 on a relatively "moment free" basis. It is especially important that the bearings permit free rotation of the tire support means in yaw, and that the constraint on the forward mount on the tire support means does not impose any moment forces on the tire support means during testing procedures. The forward portion 44 of the tire support means is positioned in such a way that the front load reaction point is subjected to lateral forces of the test tire, generated upon engagement of the tire and the grooved drum 20 in a manner that produces sizable moments at the forward bearings.

The coupling means 60 is mounted on a carriage 52 which is, in turn, mounted on a track means 50 for guiding the movement of the carriage during testing procedures. In the apparatus shown, the track means 50 is parallel to the axis 32 of rotation of the drums 20 and 28, which is parallel to the axis of rotation of the tires on the tire support means 40 in the absence of any external forces or affects on tire rotation.

A means 70 for providing transverse movement of the forward end of the tire support is provided to the track means 50 in the form of a rotating screw 71. This rotating screw 71 is operated at whatever speed is desired for a particular testing procedure but would most often be operated at a single constant speed. The carriage 52 interacts with a means 74 for sensing transverse movement of the forward portion 44 of the tire support means 40 in order to provide the tester with a directly measured signal from a signal output means 82, that corresponds to the transverse movement of the forward portion of the tire support.

Correspondingly, the aft portion 42 of the tire support means 40 also interacts with a means 72 for sensing transverse movement of the test tire 12. This means 72 for sensing transverse movement of the tire interacts with a signal output means 80 that provides a signal which corresponds directly to movement of the tire 12. In general, these measured quantities of signal outputs corresponding to transverse tire and carriage movements are the critical signals desired to be measured by the tester during tire testing procedures.

A typical test of a tire includes a procedure of slowly driving the forward portion 44 of the tire support means 40 laterally and at the same time measuring the yaw attitude (difference in transverse displacements at fore and aft measurement points) of the tire support means 40 (hereinafter called "vehicle") as a function of the lateral position of the rotating test tire 12 on the grooved surface of the first rotating support drum 20. Actual testing procedures and desired results will be described in detail later in this specification.

FIG. 2 shows the tire testing apparatus 10 from a different perspective and also includes front tire support apparatus 100 for initially engaging front tires that would be attached to the tire support means 40, hereinafter referred to as "vehicle", in the event that it is desirable to test the rear tires of an actual four-wheel vehicle. This apparatus 100 includes variable support means 102 that can be adjusted in order to accommodate various positions of forward tires as mounted on the vehicle.

The front tire support apparatus 100 also includes means (not shown) for lowering tire support platforms 104 before testing is started so the vehicle is solely supported at its forward end by an attachment to the coupling 60 and at its rear end by its rear tires resting on support drums 20 and 22.

It is notable in FIG. 2 that the rear or aft portion 42 of the vehicle 40 is constructed in the form of a trailer or platform that can be loaded with various weights in order to vary the load on both the test tire 12 and the companion tire 13. This, of course, will affect the results of tire movement during testing procedures and therefore permits the testers to vary an additional item that directly relates to tire performance.

Figure 3:
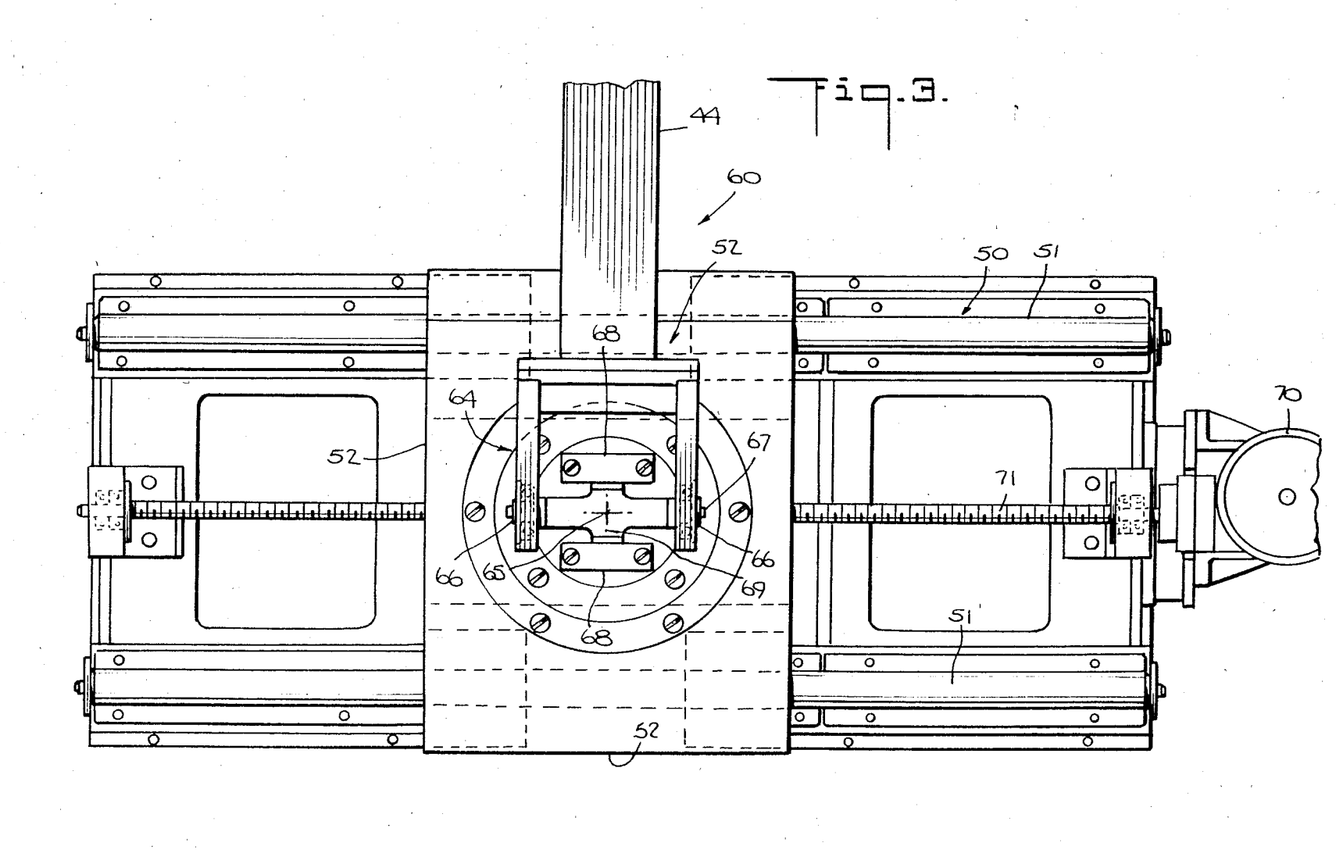
FIG. 3 is a top plan view of a coupling means and a carriage means of the subject invention.
Figure 4:
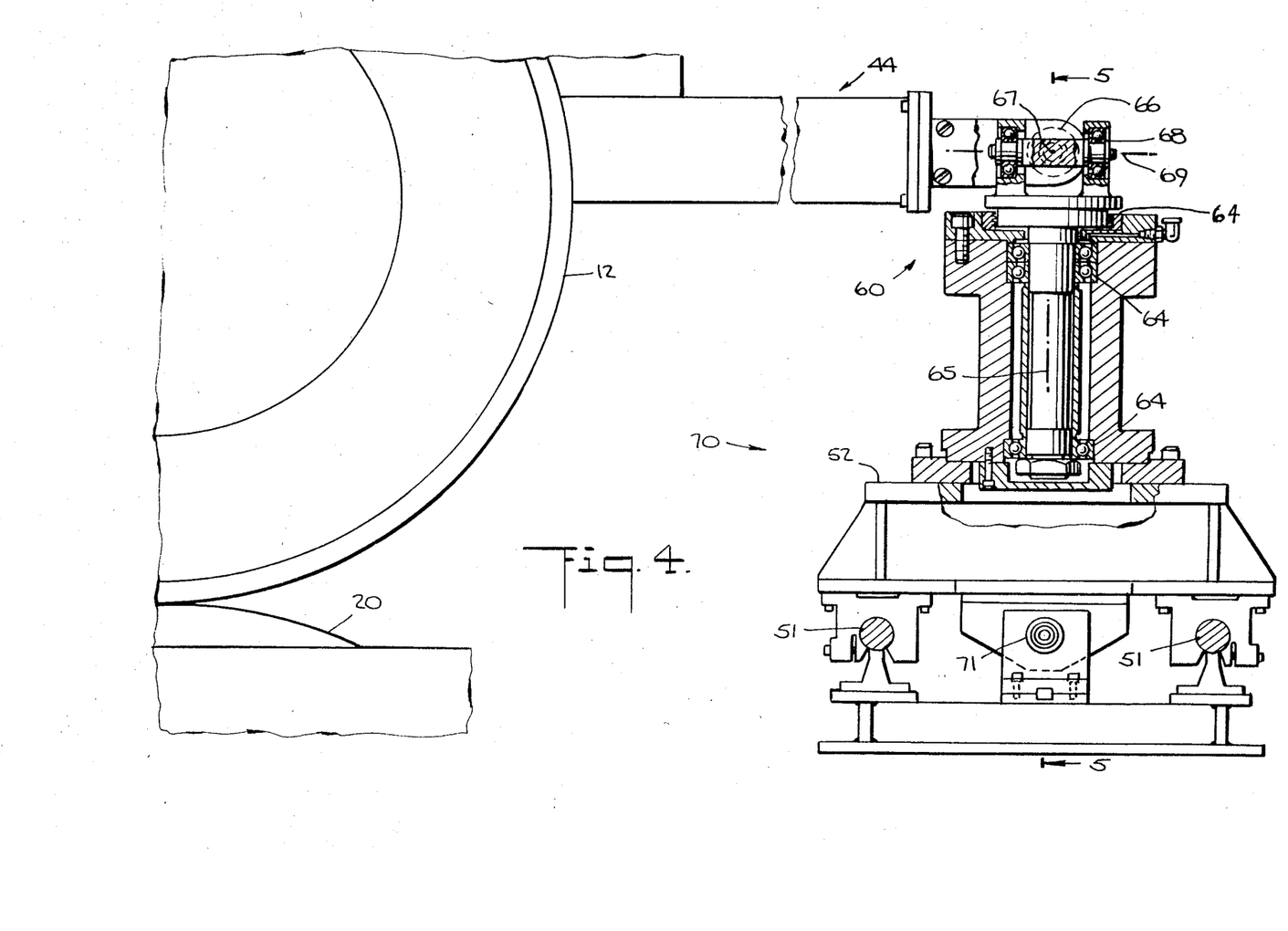
FIG. 4 is an enlarged side elevation view partially cutaway, taken along the plane of 4—4 as shown in FIG. 1, of the coupling means and carriage means of the subject invention.
Figure 5:
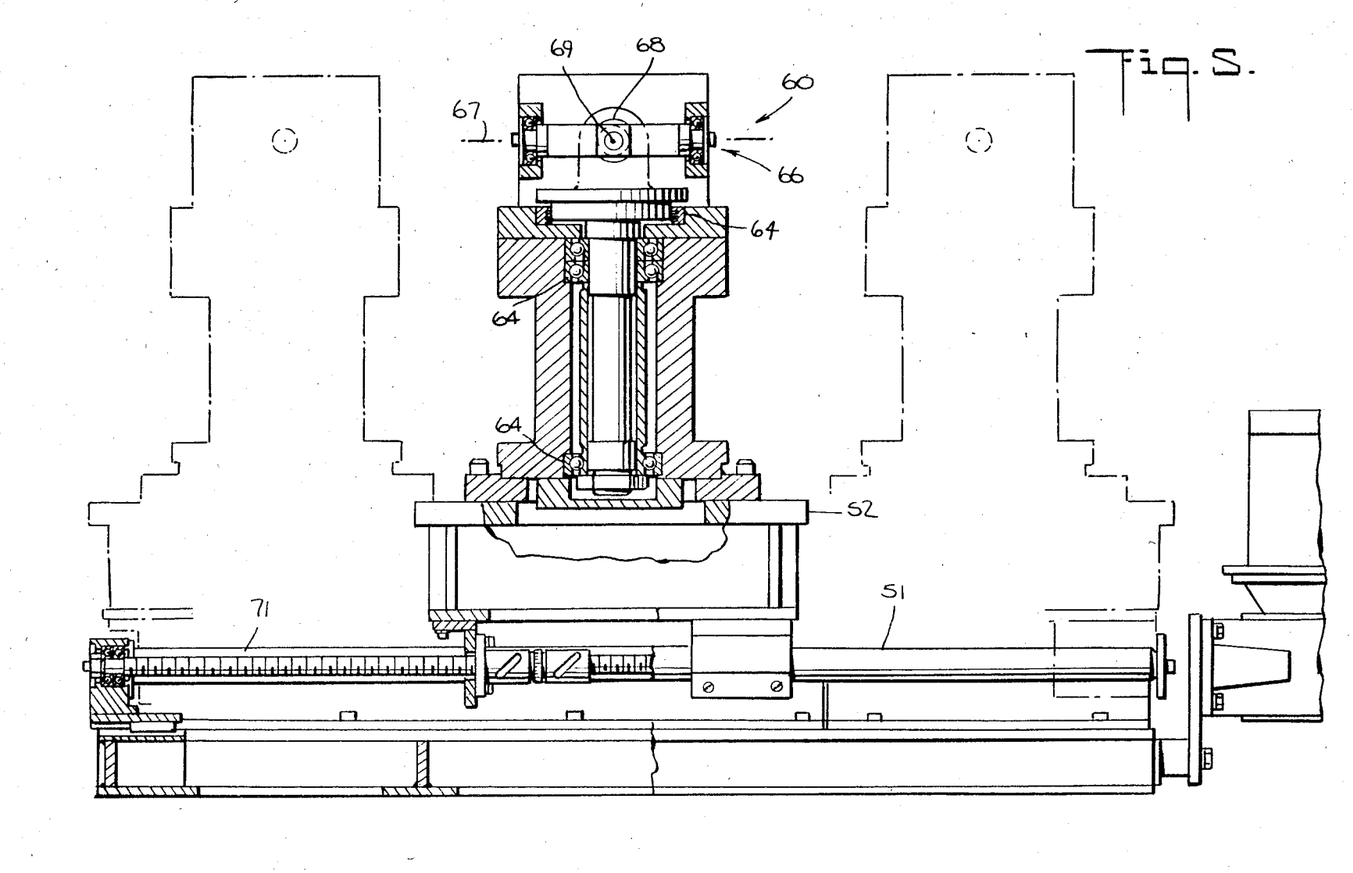
FIG. 5 is a front elevation view, partially cutaway, taken along the line 5—5 of FIG. 4, of the coupling means and carriage means.

The construction of the coupling means 60 is very important as described earlier for the purpose of providing an essentially "moment free" forward support to the test vehicle 40. Referring now to FIGS. 3, 4 and 5 a configuration of the coupling means 60 that utilizes three separate bearings is shown for the purpose of detailing the types of bearings that might be utilized, their physical arrangement and their interaction with each other in respect to the forward portion 44 of the vehicle. A thrust bearing 64 connects the coupling means 60 to the carriage 52. This thrust bearing 64 (FIG. 4) allows the coupling to rotate around its center 65 as indicated on FIG. 3. FIG. 3, of course, is a top view of the coupling and carriage. Therefore, it can be readily appreciated in reference to FIG. 3 and FIG. 1 that rotation of the coupling means about its center 65 will permit the test vehicle to yaw freely without any significant moments being imparted by the coupling means 60 onto the test vehicle. This relatively moment free movement in yaw is critical for the purpose of obtaining meaningful test results in terms of transverse movement of the test tire 12.

The two other bearings shown in FIGS. 3, 4 and 5 are also important for the purpose of obtaining accurate and meaningful test results but are not absolutely critical in the sense of the thrust bearing and its effect on the test vehicle. A first U-joint 66 provides the interconnection between the forward portion 44 of the test vehicle and the coupling means 60. This first U-joint 66 permits the test vehicle to swivel or rotate about the axis 67 of the first U-joint as indicated in FIG. 3. This permits the test vehicle to pitch relatively freely without significant moments being imparted by the coupling means.

A second U-joint 68 is also provided in the coupling means. This second U-joint 68 connects the apparatus of the first U-joint 66 with the structure of the thrust bearing 64. Again, being a U-joint, the second U-joint 68 permits rotation about its axis 69, which in turn permits the test vehicle to roll during testing procedures. This, of course, would compensate for differences in height between the two rotatable support drums and would permit a variety of surfaces to be utilized on one of the two rotating support drums during a variety of testing procedures.

In the view as shown in FIG. 3, it can be readily appreciated that the coupling means 60 is mounted on a rotating screw 71 which is guided along the track means 50 by two separate and parallel rods 51 which prevent the carriage 52 from swiveling or shifting during transverse movement of the carriage 52 on the track. A means for inducing transverse movement of the carriage 52 and, in turn, the test vehicle at its forward portion 44 is provided at 70. This might be comprised of any of a number of typical motorized screw-turning means that can be operated at any desired speed.

Referring now specifically to FIG. 4, a side, cutaway view of the coupling means 60 is shown for the purpose of greater understanding of the relative physical interaction of the three separate bearings. In this view, it can be readily appreciated that the thrust bearing 64 permits rotation of the test vehicle about the axis 65 of the coupling which in turn permits the test vehicle to yaw freely. The first U-joint 66 permits rotation of the forward portion of the test vehicle about the axis 67 of the first U-joint 66 which permits the test vehicle to pitch during testing. The axis 67 of the first U-joint is shown in FIG. 4 as a simple dot because the axis 67 actually extends directly into and out of the page as shown in FIG. 4. The second U-joint 68 permits the test vehicle to rotate or swivel about the axis 69 of the second U-joint which in turn corresponds to roll of the test vehicle. It can now be readily appreciated that the coupling means 60 essentially permits the test vehicle to move in three planes on a relatively "moment free" basis, as described earlier in the specification.

FIG. 5 is a frontal, cutaway view of the coupling means 60. In this view the thrust bearing 64 configuration is essentially the same as it appears in FIG. 4. However, the components including the first U-joint 66 and second U-joint 68 are viewed from a perspective that has been shifted 90 degrees from the perspective in FIG. 4. By comparing FIGS. 3, 4 and 5, the interaction of the three bearings can be readily appreciated.

Figure 6:
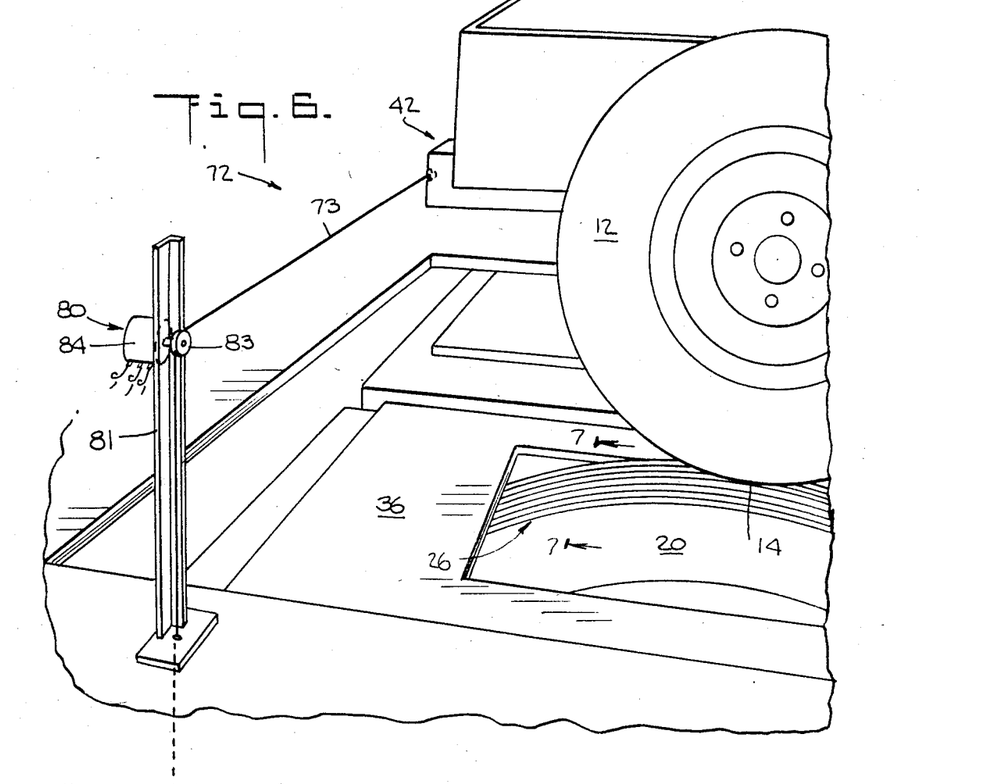
FIG. 6 is a perspective view of a means for sensing transverse movement of a portion of the apparatus of the subject invention.

Referring now to FIG. 6, there is shown the means 72 for sensing transverse movement of the tire in addition to the signal output means 80 that produces a signal corresponding to tire transverse movement. At the bottom of FIG. 6, the first rotatable support drum 20 extends through an opening in a platform 36 in order to directly engage the test tire 12. The tire tread 14 directly contacts the support drum 20 such that transverse movement of the test vehicle 40 will cause the tire tread 14 to contact different portions of the support drum 20. Correspondingly, as the tire tread 14 contacts different portions of the support drum 20, the tire 12 will be caused to further move transversely in response to the physical reaction between the tire tread 14 and any grooves 26 that are formed in the outer surface of the support drum 20. Transverse movement of the aft portion 42 of the test vehicle will cause a loaded wire 73 to move in relation to a single output means 80 on a test stand 81. Movement of the wire 73 will in turn cause rotation of a small fly wheel 83 causing movement within a potentiometer 84 which in turn causes a fluctuation in electrical signals from the potentiometer 84. This then provides the signal output corresponding directly to transverse tire movement in relation to the rotatable support drum 20.

A similar or identical such apparatus can be mounted in a similar position in relation to the coupling means 60 for the purpose of producing a signal output means that directly corresponds to lateral movement of the forward portion of the test vehicle. As best shown in FIG. 1, lateral movement of the test vehicle at its forward portion should be essentially identical to lateral movement of the carriage 52 which would normally be driven at a constant speed. When this is the case, the signal output at the forward end of the test vehicle should, if measured at the coupling 60, indicate a constant lateral velocity.

Figure 9:
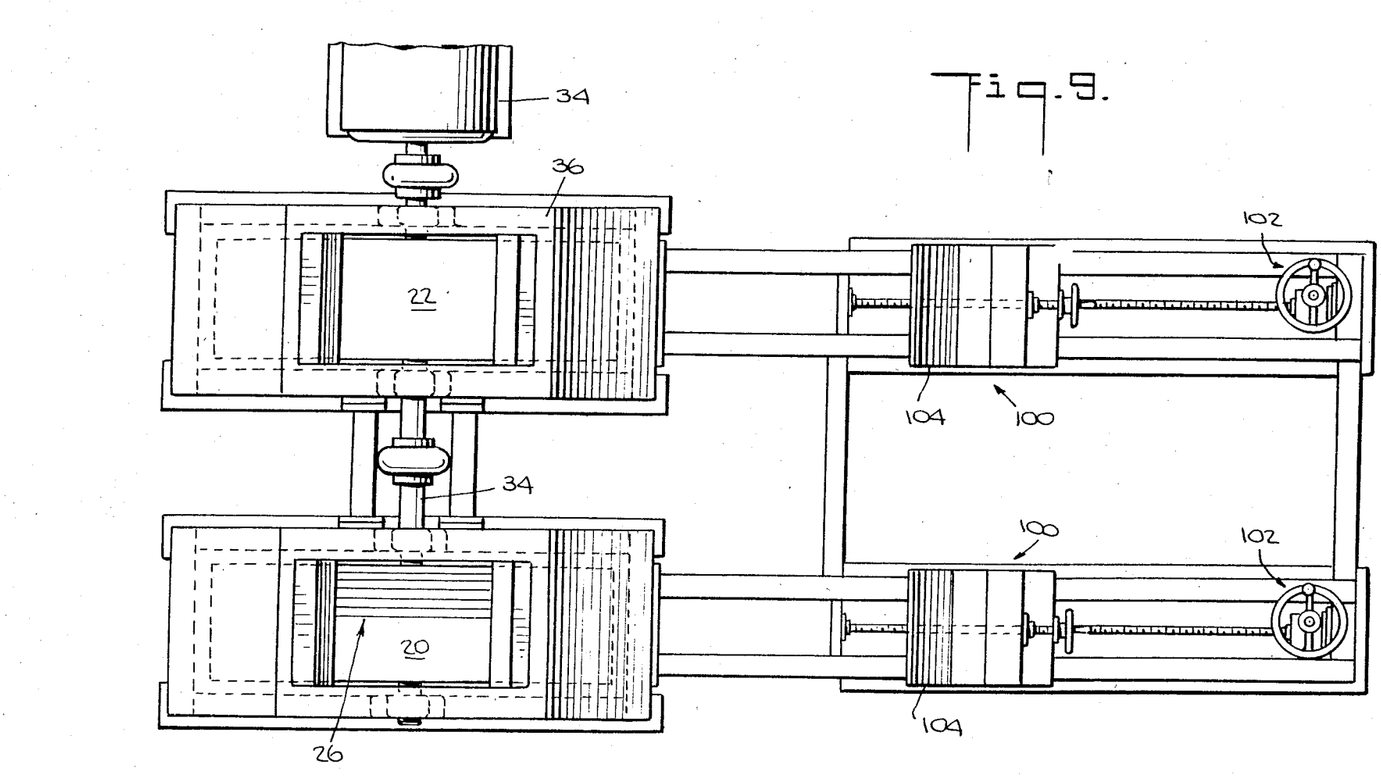
FIG. 9 is a top plan view of a portion of the subject invention.

Referring now to FIG. 9, a top view of portions of the tire testing apparatus 10 is shown including the apparatus 100 for engaging front tires of a test vehicle in order to illustrate the relative position of the means in the tire testing apparatus for supporting the tires. The first and second rotating support drums 20 and 22 respectively are attached to a single means 34 for rotating the drums so that both drums rotate at essentially the same speed. This, of course, is important in order to obtain proper test results. The first rotating support drum 20 is shown with a number of grooves 26. If it is so desired, the rotating drums themselves can be switched so that the opposite tire will interact with grooves within a rotating drum. The apparatus 100 for engaging front tires is illustrated with adjustment means 102 for the purpose of accommodating different configurations of test vehicles, such as variation in wheel base and track.

Figure 10:
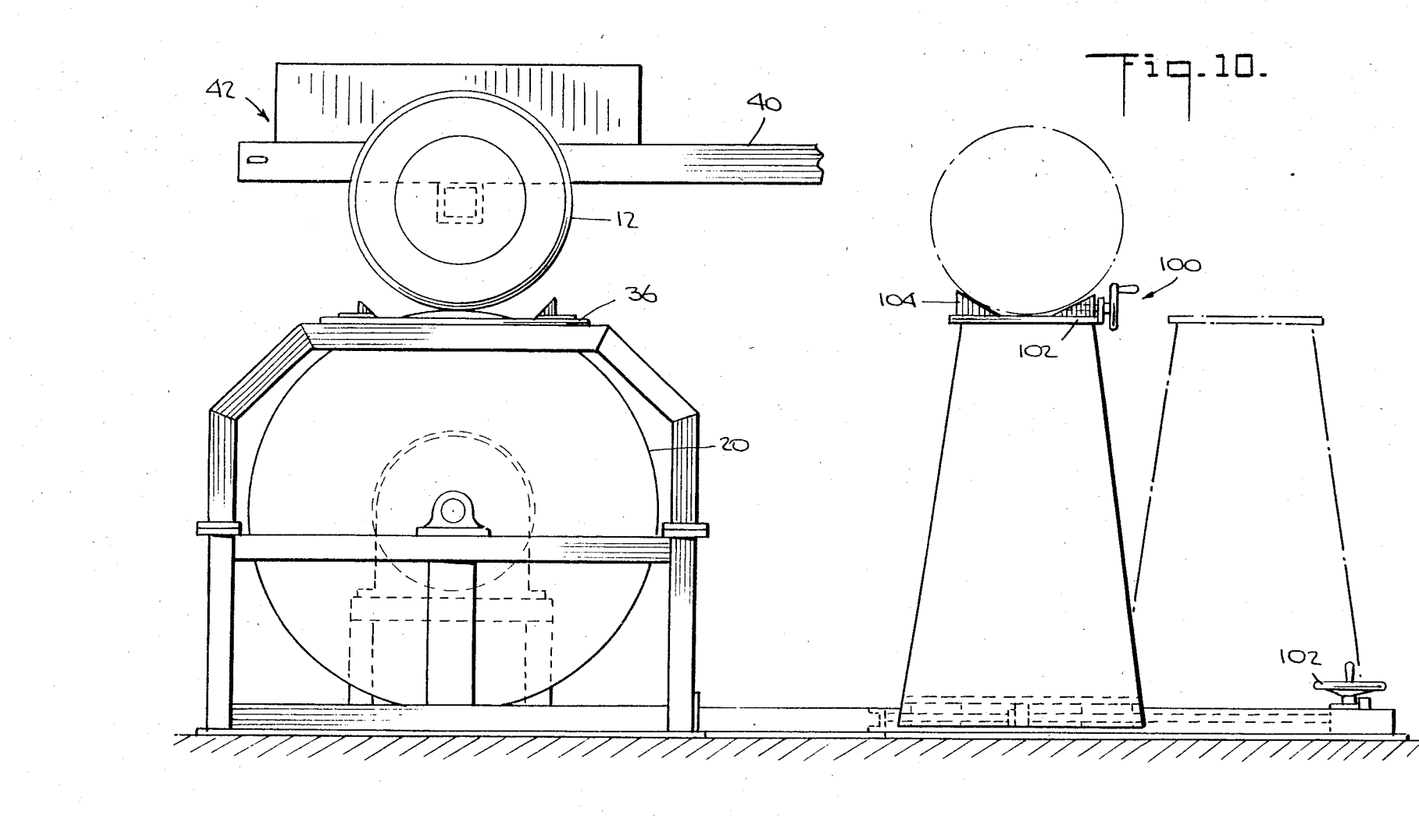
FIG. 10 is a side elevation view of a portion of the subject invention.

Portions of the apparatus as shown in FIG. 9 are mounted in respect to a platform which can be better appreciated in reference to FIG. 10 wherein certain structures located below the platform 36 are shown in relation to the test tire 12 and a portion of the test vehicle 40. This structure, as shown in FIG. 10, permits the use of a relatively large radius rotatable support drum 20 which is important for the purpose of more nearly approximating a flat road surface rather than a curved surface. A flat surface, of course, would be the case in real world conditions. The means 102 for adjusting the apparatus 100 for engaging the front tires is also shown in FIG. 10.

The purpose of the apparatus 100 is to permit the use of typical automobiles or other road-going vehicles as test vehicles. When a four-wheel vehicle is used, the front tires are initially supported by front wheel platforms 104 and the front of the vehicle is attached to the coupling (not shown in FIG. 9 or 10). Once the front of the vehicle is supported, the front wheel platforms 104 are dropped away from the vehicle leaving the front tires suspended in mid air. In this manner, any effect of the front tires is eliminated during testing procedures.

Figure 7:
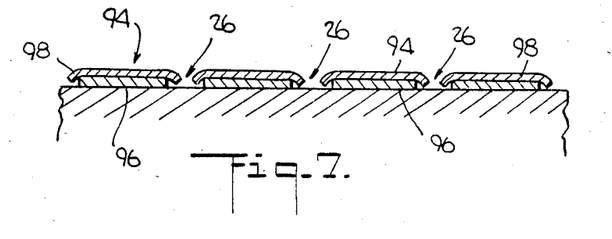
FIG. 7 is an enlarged cutaway view, taken along line 7—7 of FIG. 6, of a portion of a support drum with a grooved outer surface.

Any of a number of alternative configurations might be used on the outer surface of the rotatable support drum 20. One of the most useful configurations employed to date approximates real world conditions in typical grooved highways which have been grooved for the purpose of preventing hydroplaning of tires of vehicles during wet or rain conditions. As shown in FIG. 7 strips of abrasive cloth 94 are arranged symmetrically in respect to each other. Each of the strips 94 comprises an inner ply 96 and an outer ply 98, both provided with adhesive backing so that they will stick to each other and additionally will stick to the outer surface of the support drum 20.

The strips of abrasive cloth 94 are arranged with an axial spacing of grooves 90 which can be varied according to the desires of the tester, but will very likely be spaced so as to approximate commonly existing road conditions. The general configuration of these grooves that has been found, so far, to best approximate actual highway conditions, locates the centers of the drum grooves 26 along a circumferential orientation with the centers spaced from one another by a distance of between ½ inch (1.27 centimeters) and 1 inch (2.54 centimeters). The drum grooves 26 have a width in the range 1/16 inch (0.16 centimeter) to ¼ inch (0.64 centimeter). The outer edges of the grooves are generally arcuate in cross-sectional configuration. When the grooves are formed by strips of cloth comprising inner and outer plies of an adhesively-backed material, the inner ply of material is approximately ⅛ inch (0.32 centimeter) less in total width than the cross-sectional width of the outer ply of material.

Figure 8:
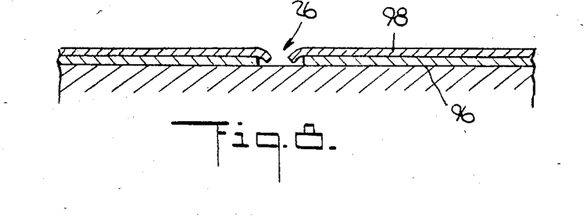
FIG. 8 is a cutaway view, similar to FIG. 7, of a different portion of a support drum with a single groove in the outer surface.

These multiple grooves that are intended to approximate the spacing of highway grooves are positioned on one side of the rotating support drum as shown in FIG. 1. A sufficient number of grooves are shown in FIG. 7 to allow an accurate assessment of the periodic interaction of tires with the multiple grooved portion of the drum. As depicted in FIG. 8, the opposite side of this same drum 20 will be provided with a single groove of essentially identical profile to the grooves shown in FIG. 7. This single groove would be positioned in a manner such that the tire can successfully engage it at all possible locations across the tire tread, without interference from other grooves or surface irregularities of the drum itself.

Referring again to FIGS. 1, 2 and 6, as the tire engages the multiple grooves on the test drum 20, measurements of the excursion of the yaw attitude, over a cycle period of interaction, will relate to performance of a vehicle occurring on an actual highway. Increased levels of activity, as measured in the laboratory, indicate higher levels of perceived motion of a real vehicle as would be assessed on a real highway.

As the tire 12 engages the single groove of the test drum 20 (in isolation of any other grooves), measurements of the yaw attitude are recorded and this would be associated with each individual transverse location along the surface of the tire tread. These data can be suitably treated to reconstruct the response that would occur on a multiple grooved surface. The technique enables diagnostic analyses, since individual contributions to the aggregate performance achieved on the multiple grooved surface are implicitly available. Means of suppressing excessive interactions, through experienced use of these techniques, are derived by appropriate analysis of these data.

TESTING PROCEDURE

A number of test configurations were investigated by the applicants during the early stages of testing usually employing equipment that is commonly used for measurement of force and moment properties of tires. A typical early configuration involved interaction of tires with road grooves with the tire oriented at some angle in respect to the road. Various orientation angles were attempted, within a range of plus or minus 5 degrees. Numerous slip angles were likewise imposed on the tire which was loaded to the level of a typical tire on a typical automobile. This original method proved inadequate in explaining the magnitude of forces observed in actual use of a vehicle on real highways.

The knowledge gained during these initial unsuccessful testing attempts led to the conception of the configuration of testing equipment as described previously in this specification.

In one embodiment of the previously described testing configuration of the subject invention, the vehicle has the freedom to yaw about a point approximately 10 feet in front of what corresponds to a vehicle rear axle. The load of the vehicle is supported at 3 points; the two rear tires that run on the two rotating support drums, and a forward reaction point corresponding to the coupling means which might be the front axle of an actual test vehicle. The front tires of the vehicle do not actually contact any equipment during testing and, thereby, do not provide any support of the vehicle's load. The vehicle is free to roll and pitch through the action of the compliant coupling means and its integral bearing surfaces. As noted previously, the travel of the carriage is constrained to the transverse (lateral) direction only.

The test tire is generally placed on the right rear position of the test vehicle so as to contact the outer surface 24 of the first rotatable support drum. In the configuration shown in FIG. 1, the inboard portion of the surface of this first rotatable support drum 20 is provided with a series of grooves 26 positioned to reproduce typical spacing of highway grooves as explained previously. A single groove is positioned on the outboard position of the support drum 20, which enables the generation of diagnostic information in respect to the reaction of specific portions of test tire tread 14 with a single highway groove. The left tire is supported on the second coaxial rotating support drum 22 which has a smooth outer surface 28. Both drums are rigidly interconnected and are driven at identical rotational velocities.

Profiles of the simulated grooves on the outer surface of the test drum 20 intentionally lack sharp edges owing to perceived conditions of highway grooves on typical highways. Although actual highway grooves exhibit a considerable degree of profile irregularity, care has been exercised on the tire testing apparatus 10 to attempt to reproduce a common profile for simulating an "average" groove profile, which can be readily reproduced in the laboratory, and generally correlates to the action of tires on typical grooved highways.

After the drums are accelerated to the tester's desired rotational velocity and the tires are loaded with the desired weight, the apparatus is ready for actual testing to begin.

The testing of a given tire starts with slowly driving the coupling means 60 and forward carriage 52 laterally at a fixed rate and continuously measuring the yaw attitude of the test vehicle (tire support means 40) as a function of the lateral position of the rotating test tire 12 on the support drum 20. Testing under these conditions has been found to yield a periodic nature of yaw attitudes, generally expressed as degrees of yaw. As one would expect from the repetitive spacing of the grooves 26 on the drum 20, the periodic nature of yaw attitude generally occurs every 0.75 inch (1.91 centimeters) of carriage 52 transverse movement, corresponding to the space repetition of grooves 26 on the drum surface 24.

Variation of speed of rotation of support drums 20 and 22, direction of carriage 52 motion and variation of transverse speed of the carriage 52 are all possible in the described tire testing apparatus 10. These factors have been explored to determine sensitivity of testing tires in reaction to all of these variables. Actual testing to date has led to a conclusion of a surprising degree of insensitivity of the tire to these specific variations. This has also led to a conclusion that the interaction of the tire with the grooves 26 is primarily determined by the relative lateral position of the test tire 12 on the grooved surface of this support drum 20.

It can be further concluded that the periodic recurrence of yaw angles in relation to interaction with highway grooves leads to the erratic, perceived, uncontrollable activity of a vehicle as it traverse grooved sections of highways. It has, therefore, been shown that the data measured on the described tire testing apparatus 10 will correspond to the actual erratic behavior of tires on actual grooved highways.

While certain specific embodiments of tire testing apparatus have been described, it is inherent that various modifications might be made to the apparatus while still accomplishing the purpose of testing tires for interaction with grooved highways.

We claim:

1. Apparatus for evaluating the interaction of a tire with a grooved support surface, comprising a means for driving said support surface; means having an aft portion and a forward portion for rotatably supporting on said aft portion a test tire under load with the test tire being in rolling engagement with the grooved support surface; track means positioned adjacent said forward portion of said tire support means, said track means being oriented generally parallel to the axis of rotation of said tire; carriage means slidably carried by said track means, means for moving said carriage means on said track means transversely of said tire support means; coupling means pivotally interconnecting said carriage means and said forward portion of said tire support means for transversely moving the forward portion of said tire support means in concert with said carriage means; and, means for sensing the movement of said tire across said support surface, said sensing means providing a signal representative of said movement of said tire.

2. The apparatus recited in claim 1 wherein said coupling means is provided with a plurality of bearings to reduce moment forces acting on said tire support means.

3. The apparatus recited in claim 2 wherein said coupling means is provided with a thrust bearing to permit said tire support means to swivel horizontally, a first U-joint to permit said tire support means to swivel vertically and a second U-joint to permit said tire support means to partially rotate about its own axis.

4. The apparatus recited in claims 1 or 3 including means for sensing transverse movement of said forward portion of said tire support means and providing a signal representative of said transverse movement thereof.

5. The apparatus recited in claim 1 including means for sensing yaw attitudes of said tire support means and providing a signal representative thereof.

6. The apparatus recited in claim 1 wherein said grooved support surface comprises a movable support surface having a plurality of grooves positioned on the outer surface thereof.

7. Apparatus as described in claims 1 or 6 wherein the centers of said grooves are generally circumferentially oriented and the centers thereof are axially spaced from one another by a distance of between ½ inch and 1 inch.

8. Apparatus as described in claim 7 wherein said grooves have a width in the range of 1/16 inch to ¼ inch.

9. Apparatus as described in claim 6 wherein said surface is provided with a plurality of axially spaced, circumferentially continuous strips of abrasive cloth, the spaces between said strips constituting said grooves, said spaces having a width in the range of 1/16 inch to ¼ inch, the centers of said grooves being axially spaced apart from one another by a distance of between ½ inch and 1 inch.

10. Apparatus as described in claim 9 wherein the circumferential outer edges of said grooves are arcuate in cross-section.

11. Apparatus for evaluating the interaction of tire treads of a test tire with a longitudinally grooved support surface, comprising a first rotatable support drum, said first drum having a plurality of generally circumferentially oriented, axially spaced grooves positioned on the outer surface thereof; a second support drum having a smooth outer surface and the same axis of rotation as the first drum; means for rotating said drums about their axis of rotation; vehicle means having an aft portion and a forward portion for coaxially rotatably supporting on said aft portion said test tire and a companion tire, under load, with the tread of the test tire being in rolling engagement with the grooved outer surface of said grooved drum and the tread of the companion tire being in rolling engagement with the smooth outer surface of said second drum, the rotational axis of said test tire and said companion tire being generally parallel to the axis of rotation of said drums; track means positioned adjacent said forward portion of said vehicle means, said track means being oriented generally parallel to the axes of rotation of said tires and said drums; carriage means slidably carried by said track means; means for selectively slidably moving said carriage means on said track means transversely of said vehicle means; coupling means pivotally interconnecting said carriage means and said forward portion of said vehicle means for transversely moving the forward portion of said vehicle means in concert with said carriage means and for causing said test tire to move transversely across the grooves of said grooved drum; and, sensing means responsive to the transverse movement of said test tire across the grooves of said grooved drum for providing a signal representative of said transverse movement of said test tire.

12. The apparatus recited in claim 11 wherein said coupling means is provided with a plurality of bearings at said coupling means to reduce moment forces acting on said tire support means.

13. The apparatus recited in claim 12 wherein said coupling means is provided with a thrust bearing to permit said tire support means to swivel horizontally, a first U-joint to permit said tire support means to swivel vertically and a second U-joint to permit said tire support means to partially rotate about its own axis.

14. The apparatus recited in claim 11 or 13 including means for sensing transverse movement of said forward portion of said tire support means and providing a signal representative thereof.

15. Apparatus as described in claim 11 wherein the centers of said drum grooves are axially spaced from one another by a distance of between ½ inch and 1 inch.

16. Apparatus as described in claim 11 wherein said drum grooves have a width in the range of 1/16 inch to ¼ inch.

17. Apparatus as described in claim 11 wherein the surface of said drum is provided with a plurality of axially spaced, circumferentially continuous strips of abrasive cloth, the spaces between said strips constituting said grooves, said spaces having a width in the range of 1/16 inch to ¼ inch, the centers of said grooves being axially spaced apart from one another by a distance of between ½ inch and 1 inch.

18. Apparatus as described in claim 17 wherein the circumferential outer edges of said grooves are arcuate in cross-section.

19. The apparatus recited in claim 11 including means for sensing yaw attitudes of said tire support means and providing a signal representative thereof.

20. Apparatus for evaluating the interaction of treads of a test tire with a longitudinally grooved support surface, comprising a first rotatable support drum, said first drum having a plurality of axially spaced, circumferentially continuous strips of abrasive cloth, the spaces between said strips constituting grooves, wherein the circumferential outer edges of said grooves are arcuate in cross-section, said spaces having a width in the range of 1/16 inch to ¼ inch, the centers of said grooves being axially spaced apart from one another by a distance of between ½ inch and 1 inch; a second rotatable support drum having a smooth outer surface and the same axis of rotation as said first drum; means for rotating said drums about their axis of rotation; vehicle means having an aft portion and a forward portion for coaxially rotatably supporting on said aft portion a test tire and a companion tire, under load, with the tread of the test tire being in rolling engagement with the grooved outer surface of said grooved drum and the tread of the companion tire being in rolling engagement with the smooth outer surface of said smooth-surfaced drum, the rotational axis of said test tire and said companion tire being generally parallel to the axis of rotation of said drums; track means positioned adjacent said forward portion of said vehicle means, said track means being oriented generally parallel to the axes of rotation of said tires and said drums; carriage means slidably carried by said track means; means for selectively slidably moving said carriage means on said track means transversely of said vehicle means; coupling means pivotally interconnecting said carriage means and said forward portion of said vehicle means for transversely moving the forward portion of said vehicle means in concert with said carriage means and for causing said test tire to move transversely across the grooves of said grooved drum; said coupling means being provided with a thrust bearing to permit said tire support means to swivel horizontally, a first U-joint to permit said tire support means to swivel vertically and a second U-joint to permit said tire support means to partially rotate about its own axis; a first sensing means responsive to the transverse movement of said test tire across the grooves of said grooved drum for providing a signal representative of said transverse movement of said test tire; and a second sensing means responsive to the transverse movement of said forward portion of said tire support means for providing a signal representative of said transverse movement of said forward portion of said tire support means.

* * * * *